Sept. 24, 1968 C. J. SWET 3,402,761
CONTROLLABLE HEAT PIPE APPARATUS
Filed Feb. 17, 1967 3 Sheets-Sheet 2
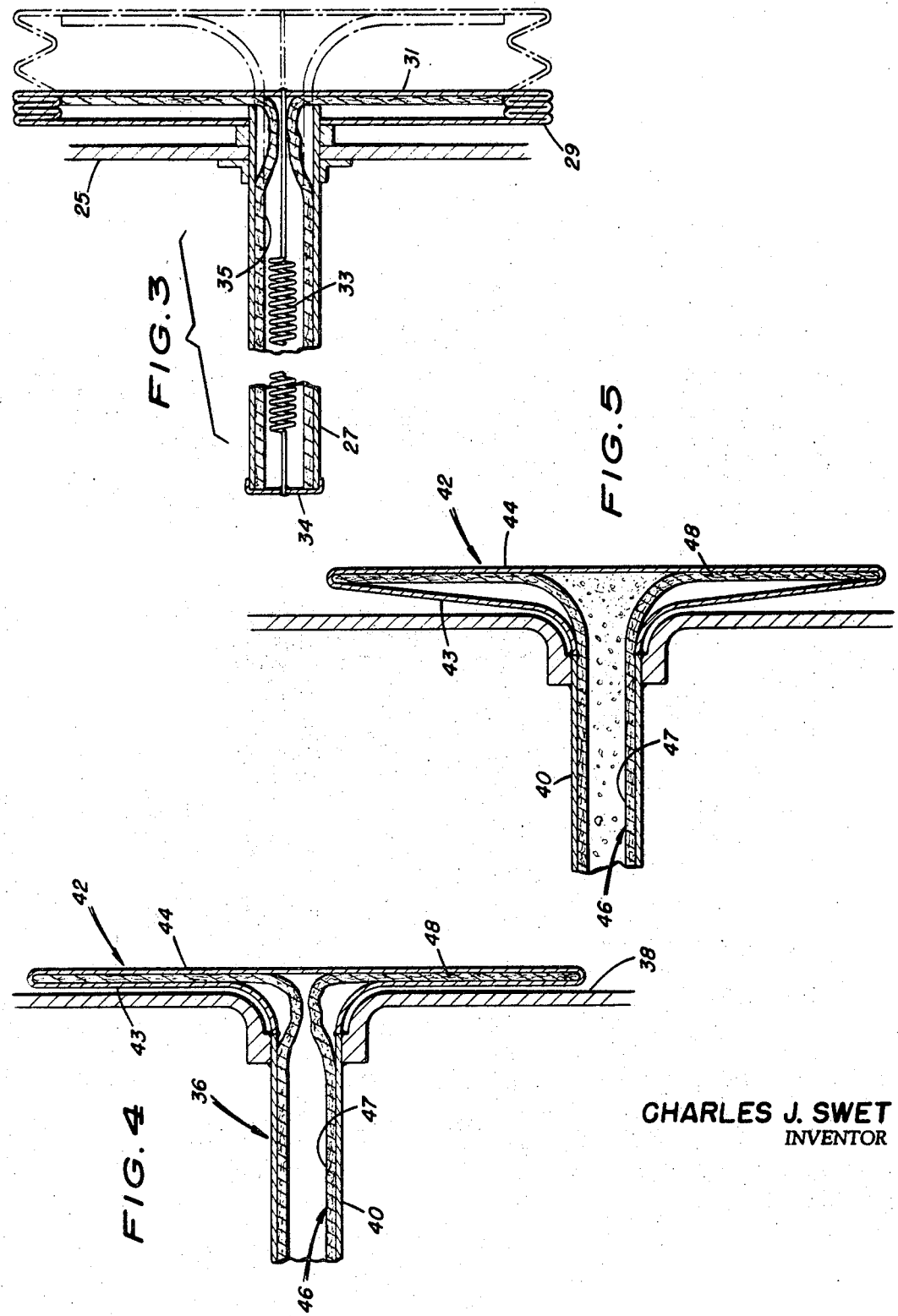
CHARLES J. SWET
INVENTOR Sept. 24, 1968  C. J. SWET  3,402,761
CONTROLLABLE HEAT PIPE APPARATUS
Filed Feb. 17, 1967  3 Sheets-Sheet 3

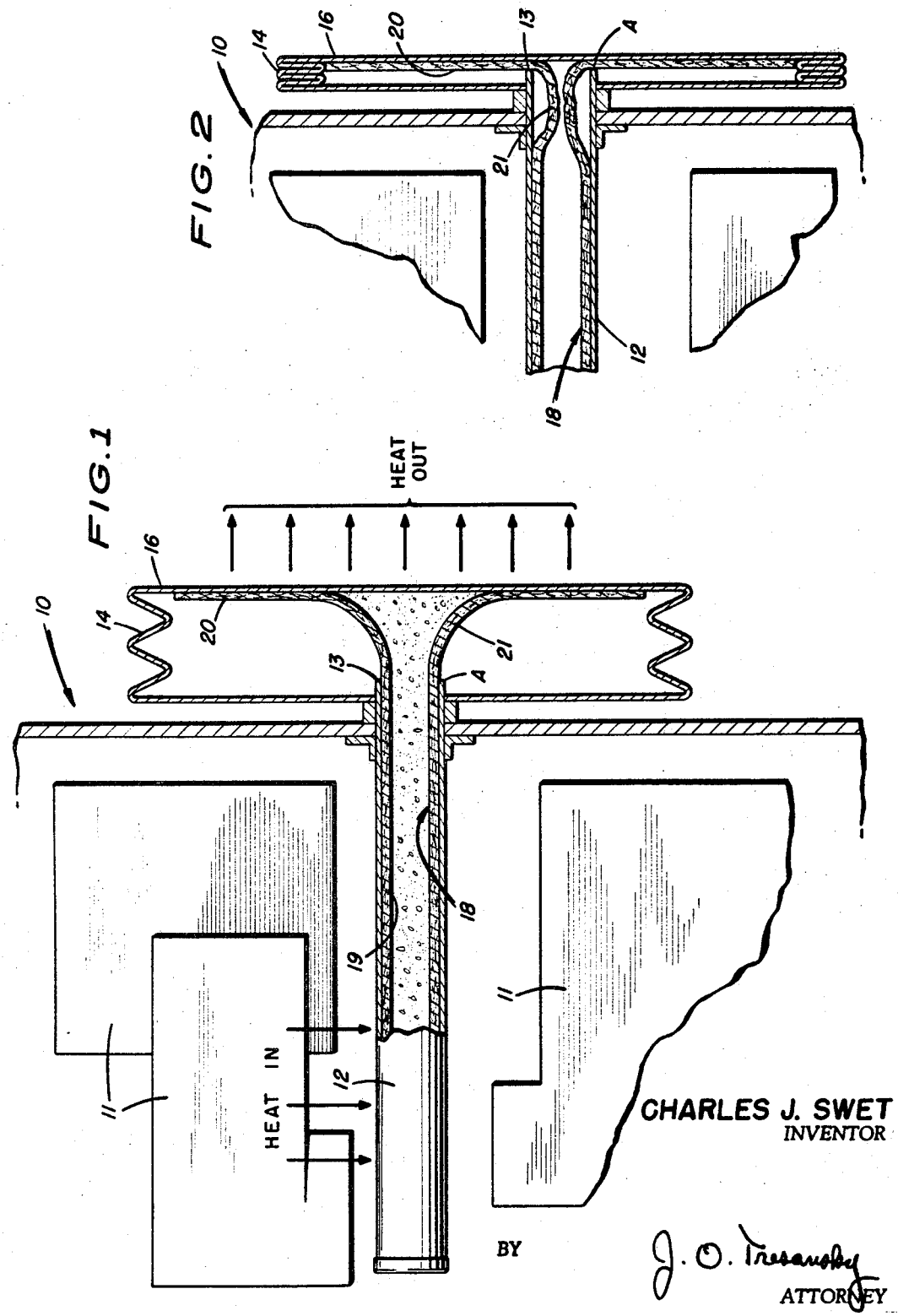

CHARLES J. SWET
INVENTOR

United States Patent Office 3,402,761
Patented Sept. 24, 1968

3,402,761
CONTROLLABLE HEAT PIPE APPARATUS
Charles J. Swet, Mount Airy, Md., assignor to the United States of America as represented by the Secretary of the Navy
Filed Feb. 17, 1967, Ser. No. 617,781
7 Claims. (Cl. 165—32)

ABSTRACT OF THE DISCLOSURE

The present invention generally pertains to a heat pipe for discharging heat from the interior of a satellite or other space vehicle. The invention utilizes a radiator element which is movable axially for regulating the discharge of heat from the satellite so that the interior thereof may be maintained at a desired temperature. The radiator element also serves as a condenser for the vapor, which is returned as liquid to the heat input end of the pipe by a wick.

---

The present invention relates generally to heat pipes, and more particuluarly to apparatus for controlling heat discharge from such pipes.

Heat pipes are well known and find particular use in space vehicles, as evidenced by the disclosure contained in U.S. Patent No. 3,152,774, Theodore Wyatt, inventor, assigned to the U.S. Government. Various methods of control of heat discharge from such pipes have also been suggested and are disclosed in several co-pending patent applications also assigned to the U.S. Government. All of these methods of control, however, utilize non-condensible gases or mechanical valves for regulating heat discharge. In the interest of simplicity and ease of manufacture, however, a more straightforward approach is desirable.

One object of the present invention, therefore, is to provide controllable heat pipe apparatus utilizing a radiator element that also serves as a condenser for the heat pipe and which is movable axially for regulating the discharge of heat from, say, a space satellite, whereby the interior of such satellite may be maintained at a desired temperature.

The invention contemplates, as another object, the provision of controllable heat pipe apparatus which utilizes the thermodynamic properties of the working fluid in the heat pipe, e.g., a two-phased fluid such as water, for effectuating movement of the radiator element and thus the control of heat discharge from a satellite or other body in which the apparatus is mounted.

A further object of the invention is to provide apparatus for the purpose set forth which, in a modified embodiment, makes use of working fluid in its liquid form to arrest heat discharge, but which working fluid, when vaporized, will function to effect such heat discharge.

And still another object of the invention resides in the provision of heat pipe control apparatus which, in a further modified embodiment, controls heat discharge by varying the effective area of the heat radiating surface.

Other objects and many of the attendant advantages of this invention will be readily appreciated as the same becomes better understood by reference to the following detailed description when considered in connection with the accompanying drawings, wherein:

FIG. 1 is an axial section, partially in elevation and partially diagrammatic, showing the heat pipe control apparatus of the present invention as it would appear installed in a satellite, and with the radiating element employed in position for maximum heat discharge;

FIG. 2 is a fragmentary section showing the heat radiating element positioned for minimum heat discharge;

FIG. 3 is an axial section showing a modified embodiment of the invention;

FIG. 4 is an axial section, partly broken away, showing another modified embodiment of the invention, and illustrating the heat radiating element in position for minimum heat discharge;

FIG. 5 is a view similar to FIG. 4 but showing the heat discharge element in a position for maximum heat discharge;

Figure 7:
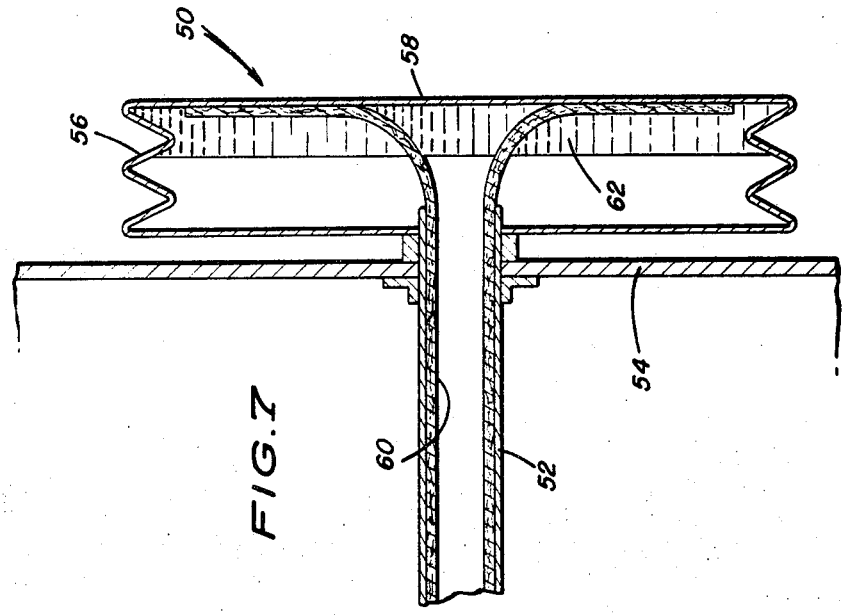
FIG. 7 is a view similar to FIG. 6 but showing the bellows expanded.

Referring now to the drawings in more detail, and first to FIGS. 1 and 2 thereof, a satellite body is shown generally at 10. The satellite body may be of any desired configuration and is assumed to contain electronic equipment and possibly other heat generating apparatus, such as is shown in block diagram at 11.

Mounted in the satellite 10 is a heat pipe 12 which has a tubular heat input section closed at its inner end and an outer end open and shaped to form a valve seat 13. Surrounding the outer end of the heat pipe 12 and having an inner wall secured to the heat pipe adjacent the valve seat 13 is a bellows 14. The outer end of the bellows is closed by a wall which defines a heat radiating element 16 which also serves as a condenser. Mounted within the heat pipe 12 and extending within the bellows and along the inner surface of the element 16 is a wick 18. The wick includes a tubular portion 19 which is contained in the heat pipe 12, a flat circular portion 20, which is suitably secured to the inner surface of the element 16, and a connecting portion 21. Water, or some other appropriate two-stage working fluid, is contained within the heat pipe and saturates the wick. As will be seen, the inner surface of the radiating element, the seat 13, and the wick 18 adjacent thereto cooperate to form a valve A. It should also be understood that the bellows 14 is so designed that in the absence of fluid flow therein it will be in contracted position.

When excess heat within the satellite, such as might be generated by exposure thereof to the sun and by the electronic equipment 11 therein, impinges on the surface of the heat pipe 12, the working fluid will, as shown in FIG. 1, be caused to vaporize and flow outwardly and cause the bellows 14 to expand and the element 16 to shift axially, when the valve A will open. When the vapor created by the heated fluid impinges on the inner surface of the element 16, which is relatively cool, said vapor will condense and flow into the wick for return thereby to the interior of the heat pipe. Thus, so long as the temperature of the heat flowing against the heat pipe 12 is sufficiently high to cause vaporization of the liquid therein, the pressure of such vaporization will cause the valve A to remain open and the bellows 14 to remain expanded so that the entire surface of the element 16 will function to condense said vapor and thus effect the discharge of heat from the interior of the satellite.

Movement of the satellite to a position not exposed to the sun, or a reduction in the thermal output of electronic equipment therein, will result in a decay of heat within said satellite, with the result that vaporization of the fluid in the heat pipe 12 will not take place and the bellows 14 may contract to a position such as is shown in FIG. 2. Such contraction of the bellows will cause the element 16 to force adjacent portions of the wick 18 against the valve seat 13 for closing the valve A and restricting any further vapor flow. At the same time the portion 21 of the wick 18 will constrict, for reducing heat flow to the element 16. Thus the discharge of heat from the interior of the satellite will be arrested. As will be obvious, the apparatus of FIGS. 1 and 2 may be so designed that expansion or contraction of the bellows, for effecting maximum or minimum heat discharge from the satellite, may be caused to take place at desired predetermined temperatures within the satellite, so that a nearly constant temperature in said satellite may be maintained.

From a reading of the foregoing it will be clear that a nearly constant compressive force will close the valve A whenever the working fluid temperature, and thus the pressure, falls below a desired predetermined value. At a slightly higher temperature, the increased vapor pressure will partially open the valve to permit some vapor flow and establish a thermal balance at that temperature. Further increases in heat input to the pipe 12 would further increase the vapor volume with virtually no attendant rise in temperature or pressure, with the result that the vapor flow passage will be enlarged to accommodate the higher heat flux. Conversely, a reduction in heat flux will tend to close the valve A with little accompanying reduction in temperature.

Referring to the modification of the invention shown in FIG. 3, the satellite is illustrated at 25, the heat pipe at 27, the bellows at 29 and the heat radiating element at 31. In this embodiment, a spring 33 is employed for returning the bellows 29 to contracted, or compressed, position upon the decay of vapor flow. More specifically, the spring has its inner end secured to a closed inner end wall 34 of the heat pipe 27 and its outer end fastened to the axial center of the element 31. A wick 35, which is similar to the wick 18 of FIGS. 1 and 2, is used in this embodiment of the invention and serves the same purpose. In FIG. 3 the bellows is shown in full lines in its compressed position and in broken lines in its expanded position. The spring is so designed that its tension will be nearly constant over the full length of travel of the bellows. It should be further understood that the bellows of this embodiment is so designed that it may expand or contract without impeding the movement of the element 16. The operation of this modification of the invention is, except for the spring action above described, the same as that of the invention of FIGS. 1 and 2.

In the embodiment of the invention illustrated diagrammatically in FIGS. 4 and 5, the heat pipe is shown at 36 and the outline of a satellite at 38. The heat input section of the pipe 36 is shown at 40 and is of tubular configuration, is closed at its inner end, and is normally positioned within the satellite. The heat pipe 36 also includes a flat circular housing 42 which is located exteriorly of the satellite and is connected to the input portion 40 at its outer end and which includes a resilient wall 43 and a radiating element 44. A wick 46 has a tubular portion 47 disposed within the section 40 and a flat circular section 48 which lies adjacent the inner surface of the radiating element 44.

The heat pipe 36, like those of the previously described embodiments of this invention, normally contains a two-stage working fluid such as water. When heat from a heat source within the satellite, and/or from the sun when the satellite is fully exposed thereto, impinges on the section 40 of the heat pipe, the working fluid therein will be caused to vaporize and flow outwardly for forcing the housing 42 away from the outer wall of the satellite, when said element will provide an effective condensing surface throughout its area. Heat contained in the vapor flow will thus be discharged from the satellite and, at the same time, said vapor flow will be caused to condense and return to the section 40 of the heat pipe through the sections 47 and 48 of the wick 46. When the temperature is lowered within the satellite, the element 44 will return to the position shown in FIG. 4, i.e., with only the center area thereof exposed to the outer end of the section 40 of the heat pipe. In this position a minimum condensing, and thus heat radiating, surface will be presented and minimum heat discharge from the satellite will take place.

From the above description of the modification of the invention as shown in FIGS. 4 and 5, it will be understood that heat flow may be controlled by varying the effective area of vapor/radiator interface, which is in turn governed by the axial location of the radiating surface. Thus, axial displacement changes the radial flow passages for varying the relative vapor flow rate to each annular zone on the condensing surface of the element 44 and establishing the radial distance of effective vapor penetration. Accordingly, by proper geometry selection it is possible to attain nearly any desired relationship between motion and interface area. Moreover, this modification of the invention provides a relatively large degree of heat regulation with minimal displacement of the housing 42.

Figure 6:
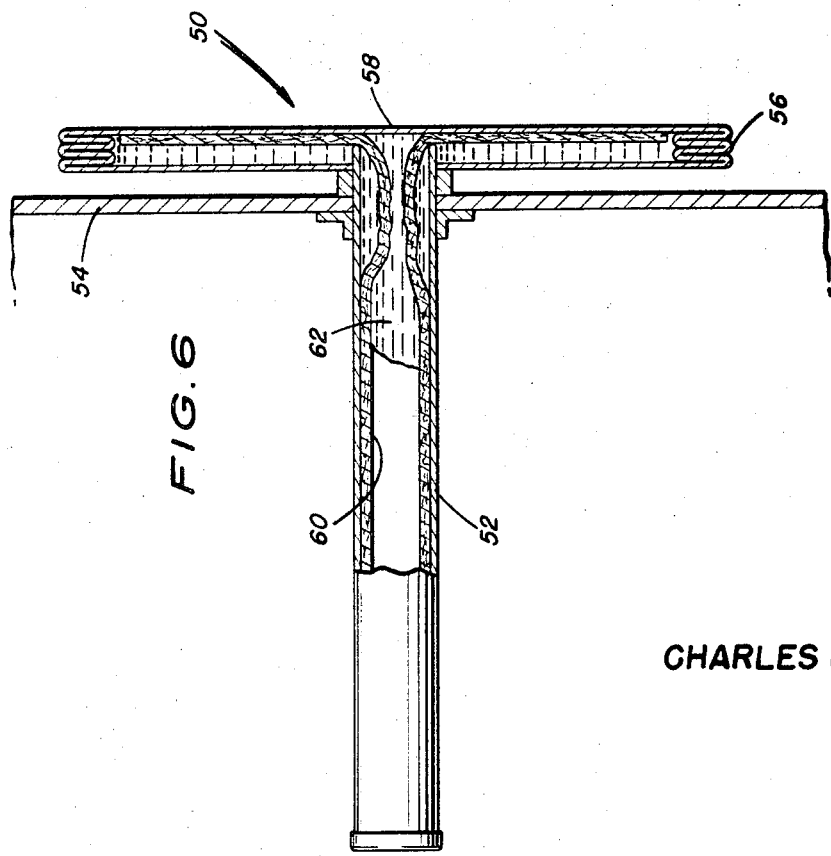
FIG. 6 is an axial section showing a further modified embodiment of the invention, with the bellows employed in contracted position.

In view of the fact that mechanical throttling alone may not adequately restrict the flow of vapor from the heat pipe at very low heat inputs, the supplemental use of the working liquid itself may be employed for the purpose. Such an arrangement is provided in the modification of the invention shown in FIGS. 6 and 7 of the drawings. The structure of the modification of FIGS. 6 and 7 is similar to that of FIGS. 1 and 2, described hereinabove. More specifically, the heat pipe is shown generally at 50 and includes a tubular input section 52 which is closed at its inner end and is positioned within a satellite, a wall of which is shown at 54. Secured to the outer end of the section 52 is a bellows 56 which has an outer end wall that defines a heat radiating element 58 and also acts as a condenser. A wick 60 is mounted in the heat pipe and extends from the section 52 thereof into the bellows to lie against the inner surface of the radiating element 58.

Water or some other two stage liquid 62, in an amount sufficient to close the outer end of the input section 52 when the bellows 56 is in contracted position (as shown in FIG. 6), is placed in the heat pipe. This liquid 62 will greatly reduce heat flow at relatively low temperatures from the input section to the bellows. When the heat input to the tubular section 52 increases to the extent that the liquid 62 is caused to vaporize, the vapor will flow from the said tubular section into the bellows for expanding the same. As in the first-described embodiment of the invention, heat from the vapor flow will be discharged by the radiating element 58, and said vapor will be condensed by said element and returned to the input section 52 by the wick 60. Excess liquid 62 will remain in the bellows, as shown in FIG. 7. Since the satellite will be in a weightless environment, the excess liquid will not necessarily take the position shown in FIG. 7, but may deposit itself at any location within the heat pipe.

Obviously, many modifications and variations of the present invention are possible in the light of the above teachings. It is therefore to be understood that within the scope of the appended claims the invention may be practiced otherwise than as specifically described.

What is claimed is:
1. In heat pipe control apparatus,
   a heat pipe having a heat input section exposed to a source of heat, and
   axially movable means for controlling heat flow from the heat input section,
   said axially movable means including a flat circular housing which includes a resilient wall and a heat radiating element,
   said element and said wall being mutually engageable for limiting the effective heat radiating area of the element.

2. Heat pipe control apparatus as recited in claim 1, wherein
   said heat pipe includes a supply of vaporizable fluid which upon vaporization conducts heat to said radiating element for emission thereby,
   wherein said radiating element condenses said vapor, and including additionally a wick in the input section and adjacent the radiating element for returning condensed vapor to the heat input section.

3. Heat pipe control apparatus as recited in claim 1, wherein said axially movable means comprises a bellows.

4. Heat pipe control apparatus as recited in claim 3, wherein said heat input section has an open end defining a valve seat,
and wherein said heat radiating element and a portion of said wick cooperate with the valve seat to define a valve for controlling vapor flow from the heat input section upon axial movement of the bellows.

5. Heat pipe control apparatus including
a heat pipe having a heat input section provided with an open end,
vaporizable fluid in the heat pipe,
a heat radiating element,
flexible means connecting the heat radiating element to the heat input section, and
fluid conducting means in the heat pipe input section and adjacent the heat radiating element,
said flexible means and fluid conducting means and a portion of said radiating element in a first position closing said open end for retaining fluid in the input section,
said fluid being converted into vapor by heat impinging on the input section, said vapor shifting the radiating element and the flexible means to a second position away from the input section for admitting heat to said radiating element for discharge thereby,
said radiating element condensing said vapor and said fluid conducting means conducting condensed vapor to the heat input section.

6. Heat pipe control apparatus as recited in claim 3, including additionally a spring connected between the heat input section and the heat radiating element and urging the bellows toward a compressed position.

7. Heat pipe control apparatus as recited in claim 4, wherein the bellows is compressed upon cessation ot vapor flow from the input section toward the heat radiating element,
and wherein said supply of vaporizable fluid will fill the open end of the input section upon compression of the bellows,
whereby transfer of heat from the input section to the radiating element at a temperature below that causing fluid vaporization will be prevented.

References Cited

UNITED STATES PATENTS

| 2,028,260 | 1/1936 | Vernet | 165—105 X |
| 2,875,263 | 2/1959 | Narbut | 165—105 X |
| 3,152,774 | 10/1964 | Wyatt | 244—1 |
| 3,229,759 | 1/1966 | Grover | 165—105 |
| 3,330,130 | 7/1967 | Schraith et al. | 62—119 X |
| 3,332,476 | 7/1967 | McDougal | 165—105 X |
| 1,975,868 | 10/1934 | Schlumbohm | 165—32 X |
| 2,010,431 | 8/1935 | Hulse | 165—105 X |

ROBERT A. O'LEARY, *Primary Examiner.*

A. W. DAVIS, *Assistant Examiner.*